(12) United States Patent
Reyes

(10) Patent No.: US 10,196,147 B2
(45) Date of Patent: Feb. 5, 2019

(54) FRONT ROW MODULE

(71) Applicant: Zodiac Seats US LLC, Gainesville, TX (US)

(72) Inventor: Raul G. Reyes, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/757,825

(22) PCT Filed: Jun. 7, 2016

(86) PCT No.: PCT/US2016/036207
§ 371 (c)(1),
(2) Date: Mar. 6, 2018

(87) PCT Pub. No.: WO2017/044164
PCT Pub. Date: Mar. 16, 2017

(65) Prior Publication Data
US 2018/0339775 A1    Nov. 29, 2018

Related U.S. Application Data

(60) Provisional application No. 62/217,277, filed on Sep. 11, 2015.

(51) Int. Cl.
*B64D 11/00* (2006.01)
*B64D 11/06* (2006.01)
(Continued)

(52) U.S. Cl.
CPC .... *B64D 11/00153* (2014.12); *B64D 11/0638* (2014.12); *B60N 3/002* (2013.01);
(Continued)

(58) Field of Classification Search
CPC .. A47C 7/624; A47C 7/68; A47C 7/70; B64D 11/00153; B64D 11/0638;
(Continued)

(56) References Cited

U.S. PATENT DOCUMENTS 5,996,954 A    12/1999  Rosen et al.
9,150,129 B2 *  10/2015  Suhre ................... B60N 2/4606
(Continued)

OTHER PUBLICATIONS

International Patent Application No. PCT/US2016/036207, International Search Report and Written Opinion, dated Sep. 21, 2016.

*Primary Examiner* — Mark R Wendell
(74) *Attorney, Agent, or Firm* — Kilpatrick Townsend & Stockton LLP; Dean W. Russell; Matthew T. Kitces

(57) ABSTRACT

Described is a stowable display apparatus (200) suitable for stowing a display, such as an in-flight entertainment monitor, in a storage module (110) located above a spreader or a seat bottom of a passenger seat (102). The stowable display apparatus can include an arm (228, 236) pivotally coupled to a mounting plate (222) at a pivot point (250) that is located above the spreader or seat bottom and proximate the forward end of the seat (102), thus enabling a display bracket of the arm to pivot upwards and out of an armrest assembly before rotating into a deployed position. The display arm (228, 236) can provide an easy, safe, and low-cost mechanism for stowing and deploying a display. The thin profile of the display arm allows a storage module (110) two inches wide or less to stow both a display and a table surface, each independently deployable and stowable irrespective of the other's position.

16 Claims, 14 Drawing Sheets

(51) Int. Cl.
    *B60R 11/02* (2006.01)
    *B60R 11/00* (2006.01)
    *B60N 3/00* (2006.01)
(52) U.S. Cl.
    CPC ... *B60R 11/0235* (2013.01); *B60R 2011/0014* (2013.01); *B60R 2011/0082* (2013.01)
(58) Field of Classification Search
    CPC ............... B60N 3/002; B60R 11/0235; B60R 2011/0014; B60R 2011/0082
    USPC ........................................................ 297/145
    See application file for complete search history.

(56) References Cited

U.S. PATENT DOCUMENTS

| | | |
|---|---|---|
| 2005/0012375 A1 | 1/2005 | Giasson |
| 2012/0139305 A1 | 6/2012 | Baumann |
| 2013/0070171 A1 | 3/2013 | Boyer |
| 2013/0284074 A1 | 10/2013 | Satterfield |

* cited by examiner

FRONT ROW MODULE

CROSS REFERENCE TO RELATED APPLICATIONS

This application is related to and claims priority benefits from U.S. Provisional Application Ser. No. 62/217,277 ("the '277 application"), filed on Sep. 11, 2015, entitled FRONT ROW MODULE. The '277 application is hereby incorporated in its entirety by this reference.

FIELD OF THE INVENTION

The field of the invention relates to transportation generally and more specifically to stowable display modules for use with passenger seats.

BACKGROUND

Passenger seats, such as aircraft seats, can be arranged in various configurations. It may be desirable to have tray tables, displays (e.g., in-flight entertainment monitors), and other equipment available to a passenger sitting in a passenger seat. Often, such equipment, including tray tables and displays, may be mounted to the rear of another passenger seat located in front of a first seat.

In some cases, front row seating, bulkhead seating, or other seating without another passenger seat, structure, or monument located immediately in front of the first seat can require tray tables, displays, or other equipment to be mounted to and stowable in relation to the first seat, which can require additional components and features that may increase the weight of the seat. Seats with stowable displays for the use of the passenger in those seats are usually much heavier than standard seats due to the added components and features necessary to store and manipulate the equipment.

Front row seats may include, between laterally adjacent seats, a shrouded module split into two sections, a top section above the spreader containing the tray table and a bottom section below the spreader containing the in-flight entertainment monitor. The bottom section is often referred to as the doghouse. When rotating the in-flight monitor up for use, a passenger must raise the monitor from the doghouse (e.g., at or near the passenger's legs) up to an in-use position. When returning the in-flight monitor to the doghouse, certain designs are unable to mitigate potential mechanical hazards such as pinch points near the passenger's legs or impact dangers associated with accidental dropping of the in-flight monitor mid-travel.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a stowable equipment apparatus for use with passenger seats is disclosed, comprising: a storage module couplable to a seat structure having a seat bottom, the storage module including a mounting plate; a table arm pivotally coupled to the mounting plate and movable between a table stowed position and a table deployed position, the table arm supporting a table surface, wherein the table surface is located within the storage module when the table arm is in the table stowed position, and wherein the table surface is located outside of the storage module when the table arm is in the table deployed position; and a display arm pivotally coupled to the mounting plate at a pivot point and movable between a display stowed position and a display deployed position, the display arm comprising a display bracket couplable to a display, wherein the display bracket is located within the storage module when the display arm is in the display stowed position, wherein the display bracket is located outside of the storage module when the display arm is in the display deployed position, wherein the pivot point is located above the seat bottom, wherein at least half of the display bracket is located above the seat bottom when the display arm is in the display stowed position, and wherein at least a portion of the display bracket passes above the pivot point when moving between the display stowed position and the display deployed position.

According to certain embodiments of the present invention, a passenger seat is disclosed, comprising: a spreader supporting horizontal stretcher tubes; a seat bottom supported by the horizontal stretcher tubes and positioned proximate the spreader; an armrest assembly coupled to the spreader, wherein the armrest assembly includes a storage module having a mounting plate; a table arm pivotally coupled to the mounting plate and movable between a table stowed position and a table deployed position, the table arm supporting a table surface, wherein the table surface is located within the storage module when the table arm is in the table stowed position, and wherein the table surface is located outside of the storage module when the table arm is in the table deployed position; and a display arm pivotally coupled to the mounting plate at a pivot point and movable between a display stowed position and a display deployed position, the display arm comprising a display bracket couplable to a display, wherein the display bracket is located within the storage module when the display arm is in the display stowed position, wherein the display bracket is located outside of the storage module when the display arm is in the display deployed position, wherein the pivot point is located above the seat bottom, wherein at least half of the display bracket is located above the seat bottom when the display arm is in the display stowed position, and wherein at least a portion of the display bracket passes above the pivot point when moving between the display stowed position and the display deployed position.

In some embodiments, the table arm may be pivotally coupled to the mounting plate at the pivot point. In some embodiments, the table arm may be movable between the table stowed position and the table deployed position when the display arm is in the display stowed position and when the display arm is in the display deployed position. In some embodiments, the display arm may further comprise a lower display arm section having a proximal end coupled to the mounting plate at the pivot point, wherein the display bracket is pivotally coupled to the lower display arm to rotate the display bracket outside of a plane perpendicular to an axis of rotation of the pivot point. In some embodiments, the display arm may further comprise an upper display arm section coupled between the lower display arm section and the display bracket, wherein upper display arm section is rotatable with respect to the lower display arm section to permit pivoting of the display bracket outside of the plane perpendicular to the axis of rotation of the pivot point. In some embodiments, the display arm may further comprise an upper display arm section coupled between the lower display arm section and the display bracket, wherein display bracket is pivotally coupled to the upper display arm section to permit pivoting of the display bracket outside of the plane perpendicular to the axis of rotation of the pivot point. In some embodiments, the display bracket may be further pivotally coupled with respect to the lower display arm section to rotate within the plane perpendicular to the axis of rotation of the pivot point, wherein the display arm further comprises a mechanical linkage coupled to the display bracket to rotate the display bracket within the plane perpendicular to the axis of rotation of the pivot point while the display arm is moving between the display stowed position and the display deployed position such that the display bracket maintains an upright orientation despite rotation of the display arm about the pivot point. In some embodiments, the storage module may have a width equal to or less than two inches.

According to certain embodiments of the present invention a stowable equipment arm assembly is disclosed, comprising: a display arm pivotally couplable to a mounting plate of a storage module at a pivot point and movable between a display stowed position and a display deployed position, the display arm comprising: a display bracket couplable to a display, wherein the display bracket is located within the storage module when the display arm is in the display stowed position, wherein the display bracket is located outside of the storage module when the display arm is in the display deployed position, and wherein at least a portion of the display bracket passes above the pivot point when moving between the display stowed position and the display deployed position; and a lower display arm section having a proximal end coupled to the mounting plate at the pivot point, wherein the display bracket is pivotally coupled to the lower display arm to rotate the display bracket outside of a plane perpendicular to an axis of rotation of the pivot point.

In some embodiments, the display arm may further comprise an upper display arm section coupled between the lower display arm section and the display bracket, wherein upper display arm section is rotatable with respect to the lower display arm section to permit pivoting of the display bracket outside of the plane perpendicular to the axis of rotation of the pivot point. In some embodiments, the display arm may further comprise an upper display arm section coupled between the lower display arm section and the display bracket, wherein display bracket is pivotally coupled to the upper display arm section to permit pivoting of the display bracket outside of the plane perpendicular to the axis of rotation of the pivot point. In some embodiments, the display bracket may be further pivotally coupled with respect to the lower display arm section to rotate within the plane perpendicular to the axis of rotation of the pivot point, wherein the display arm further comprises a mechanical linkage coupled to the display bracket to rotate the display bracket within the plane perpendicular to the axis of rotation of the pivot point while the display arm is moving between the display stowed position and the display deployed position such that the display bracket maintains an upright orientation despite rotation of the display arm about the pivot point.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
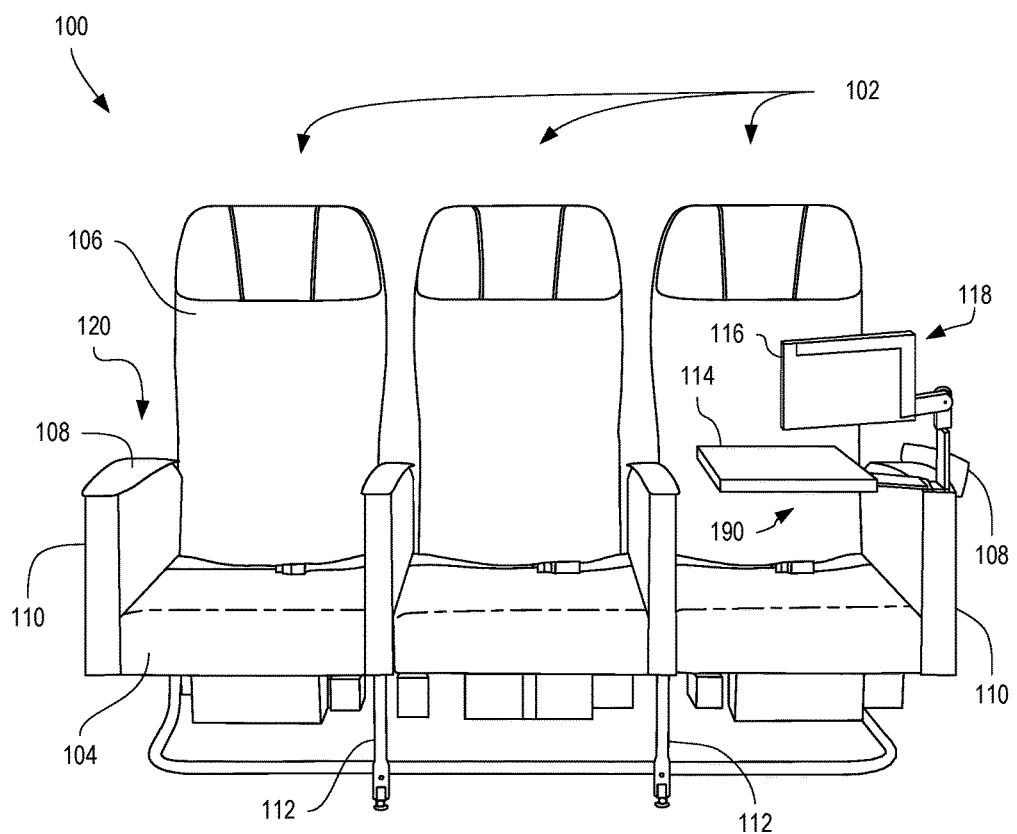
FIG. 1 is a front perspective view of a seating arrangement including three passenger seats according to certain aspects of the present disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide stowable equipment for passenger seats, specifically stowable display assemblies for stowing displays (e.g., in-flight entertainment monitors) in armrest assemblies, optionally along with stowed table surfaces. While stowable display assemblies are discussed for use with aircraft seats, they are by no means so limited. Rather, embodiments of the stowable display assemblies may be used in passenger seats or other seats of any type or otherwise as desired.

According to certain embodiments of the present invention, as shown in the attached figures, a stowable display assembly can enable a display to be stowed within an armrest assembly—entirely above the spreader—eliminating the need for display storage modules below the spreader (e.g., doghouses). Display assemblies as described herein can be especially useful for passenger seats that cannot rely on another passenger seat or other structure immediately forward to support a display or table surface. For example, front row seats, seats immediately aft of a gap in an exit row, seats immediately aft of a bulkhead or other monument, or other circumstances where it may be desirable to provide a stowable display for a passenger within or coupled to the seat structure occupied by the passenger.

According to certain aspects of the present disclosure, a stowable display assembly can provide a sufficiently thin mechanism for stowing and deploying a display such that the display assembly and a stowable table can both be fully located within a storage module that is two inches or less in width. The display assembly can enable a display to be easily withdrawn from a storage module within an armrest assembly and can allow the display to be easily positioned by a passenger into a deployed position suitable for viewing by the passenger. When a display assembly and stowable table are both used within a single armrest assembly, the kinematics of the stowable display assembly allow the stowable table to be stowed and deployed regardless of whether the stowable display assembly is stowed or deployed. The stowable display assembly can also minimize part usage and can eliminate substantial weight form each passenger seat, which can lead to substantial manufacturing, maintenance and fuel savings. Further, the stowable display assembly can be operated safely without exposing the passenger to certain hazards and dangers generally associated with under-seat stowable displays.

Described is a stowable display apparatus suitable for stowing a display, such as an in-flight entertainment monitor, in a storage module located above a spreader or a seat bottom of a passenger seat. The stowable display apparatus can include an arm pivotally coupled to a mounting plate at a pivot point that is located above the spreader or seat bottom and proximate the forward end of the seat, thus enabling a display bracket of the arm to pivot upwards and out of an armrest assembly before rotating into a deployed position. The display arm can provide an easy, safe, and low-cost mechanism for stowing and deploying a display. The thin profile of the display arm allows a storage module two inches wide or less to stow both a display and a table surface, each independently deployable and stowable irrespective of the other's position.

The various parts and elements disclosed herein—including parts and elements of the passenger seats, display assemblies, table assemblies, and armrest assemblies—can be made of any suitable material, including but not limited to aluminum, stainless steel, aramid fibers, polycarbonate, polypropylene, other metallic materials, composite materials, or other similar materials.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a front perspective view of a seating arrangement 100 including three passenger seats 102 according to certain aspects of the present disclosure. The seating arrangement 100 can include any number of passenger seats 102, including one, two, or more than three. Each passenger seat 102 can include a seatback 106 and a seat bottom 104.

Passenger seats 102 can be supported by one or more spreaders 112. A spreader 112 can attach to a floor surface (e.g., cabin floor in an airplane or other vehicle) directly or via tracks or other attachment mechanisms. The spreaders 112 can support passenger seats 102, including individual components, such as storage modules 110 and seat bottoms 104.

As used herein, the term "above the spreader" and the like may refer to a location opposite the spreader from a floor upon which the spreader is supported. In other words, the term "above the spreader" includes locations that are above a horizontal section of the spreader, even if a vertical section of the spreader extends further from the floor than those locations. For example, the seat bottom 104 can generally be considered as being located above the spreader, whereas the area between the seat bottom 104 and the floor can generally be considered as being below the spreader. As used herein, the term "above the seat bottom" and the like may refer to a location above a plane parallel to the floor or parallel to a top surface of the seat bottom 104 that passes through the seat bottom 104. As used herein, directional terms such as "above," "upwards," "top," and the like can be interpreted with reference to the passenger seats 102 as depicted in FIG. 1 (e.g., the armrest cover is located above the storage module).

As used herein, the terms "perpendicular" and "parallel" can also include substantially perpendicular or substantially parallel, as appropriate, which can include a margin of error of 45° or less, 23° or less, 20° or less, 15° or less, 10° or less, or 5° or less.

One or more armrest assemblies 120 can be located proximate each passenger seat 102. Armrest assemblies 120 can be located between adjacent passenger seats 102 or at lateral ends of passenger seats 102. Four armrest assemblies 120 are seen in FIG. 1, although any number of armrest assemblies 120 can be used. In some cases, each passenger seat 102 can include at least one armrest assembly 120 located proximate thereto.

Each armrest assembly 120 may include a storage module 110 and an armrest cover 108. The armrest cover 108 can be positioned to support an arm of a passenger while a passenger is seated in the passenger seat 102. The armrest cover 108 can be hinged or otherwise manipulatable to provide access to the interior of the storage module 110, such as through the top of the storage module 110. In some cases, the armrest cover 108 can include one or more cutouts, recesses, or may be otherwised shaped to allow the armrest cover 108 to close over the storage module 110 when the display assembly 118 or table assembly 190 are in deployed positions.

As depicted in FIG. 1, the display assembly 118 and table assembly 190 of the far right passenger seat 102 are in respective deployed positions. The table surface 114 and display 116 are each in respective deployed positions that are suitable for use by a passenger. The display assemblies and table assemblies associated with the other passenger seats 102 in FIG. 1 are shown in respective stowed positions.

Various aspects and features of display assemblies, such as display assembly 118, will be described herein. While display assemblies can be used with passenger seats 102, such as those depicted in FIG. 1, display assemblies may be used with other passenger seats having different structural elements and different configurations than those depicted in FIG. 1.

Figure 2:
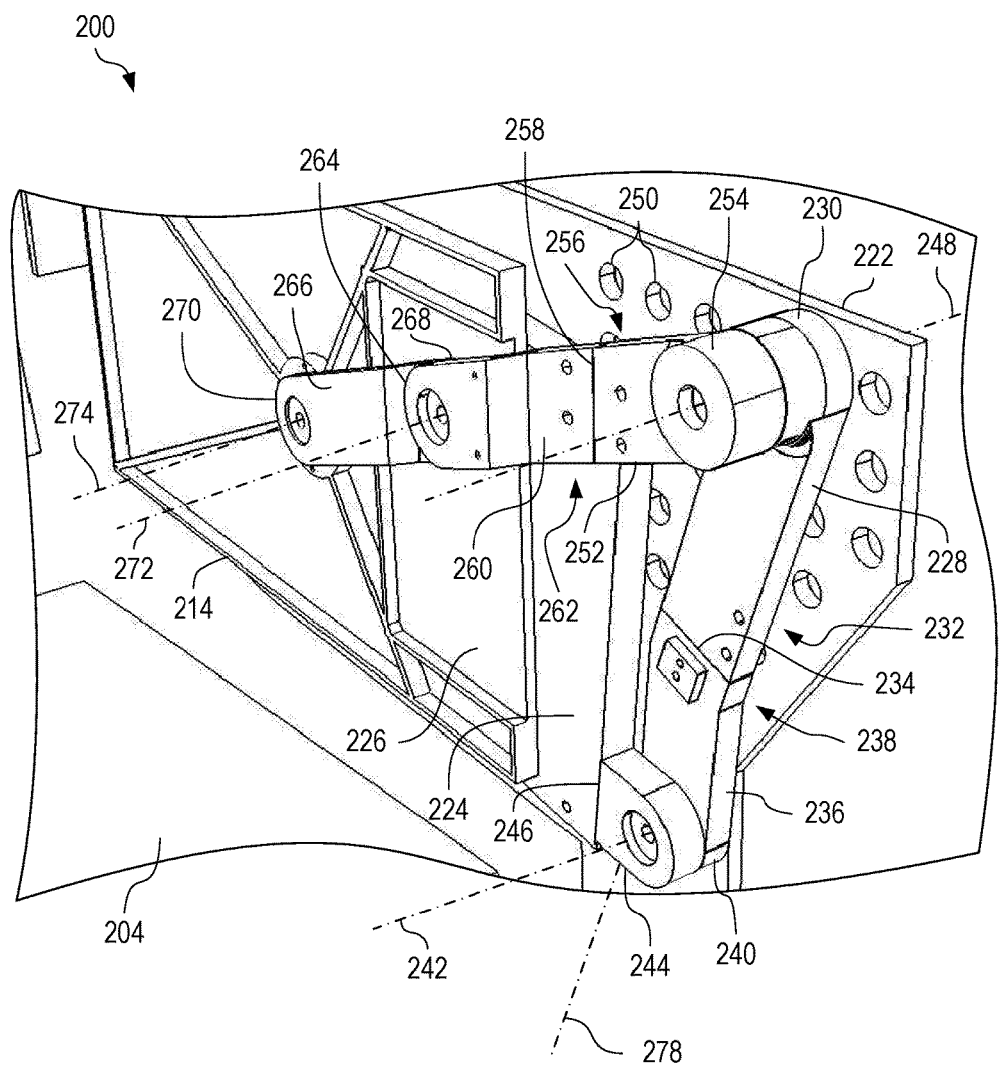
FIG. 2 is a partial axonometric depiction of a stowable equipment apparatus with a table surface and a display bracket in respective stowed positions according to certain aspects of the present disclosure.

FIG. 2 is a partial axonometric depiction of a stowable equipment apparatus 200 with a table surface 214 and a display bracket 224 in respective stowed positions according to certain aspects of the present disclosure. The stowable equipment apparatus 200 can be incorporated in a storage module or armrest assembly, such as armrest assembly 120 of FIG. 1. The stowable equipment apparatus 200 can include a support plate 222. The support plate 222 can have one or more mounting points 250. In some cases, the support plate 222 can have multiple mounting points 250. Mounting points 250 can be located at pre-determined locations that have been selected to afford compatibility with multiple styles of passenger seat, multiple styles of table surfaces or displays, or various passenger heights. Mounting points 250 can be markings (e.g., in ink), scorings, slots, apertures (e.g., holes), or any other suitable indicator or mechanism for establishing a pivot point.

The table arm assembly for the table surface 214 and the display arm assembly for the display bracket 224 can each be coupled to the support plate 222 at a mounting point 250. In some cases, both the table arm assembly and the display arm assembly can coupled to the support plate 222 at the mounting point 250, thus sharing a common pivot point and a common axis of rotation 248. In some cases, the table arm assembly and display arm assembly can be coupled to the support plate 222 at different mounting points 250. The table arm assembly and display arm assembly can couple to the support plate 222 in any way suitable for allowing pivoting about the axis of rotation 248. In some cases, end stops can be incorporated into the coupling or into the support plate 222 to limit travel of the table arm assembly or display arm assembly about the axis of rotation 248.

The table arm assembly can include an inner table arm section 252 having a proximal end 254 coupled to the support plate 222 at the axis of rotation 248 (e.g., at the pivot point) and a distal end 256 coupled to a mid table arm section 260. The mid table arm section 260 can have a proximal end 262 coupled to the distal end 256 of the inner table arm section 252 by a table hinge 258. The table hinge 258 can allow the table surface 214 to rotate from a vertical orientation to a horizontal orientation (e.g., allow the table surface 214 to rotate out of a plane perpendicular to the axis of rotation 248). The mid table arm section 260 can have a distal end 264 that is rotationally coupled to a proximal end 268 of an outer table arm section 266 at an axis of rotation 272. The outer table arm section 266 can have an outer table arm distal end 270 that is rotationally coupled to the table surface 214 at an axis of rotation 274, allowing the proximal end 268 to slide within the recess 226.

In some cases, the outer table arm section 266 and mid table arm section 260 can be coupled together with a mechanical linkage that maintains the orientation of the table surface 214 as the outer table arm section 266 rotates with respect to the table surface 214 about axis of rotation 274. The mechanical linkage can allow the table surface 214 to slide forwards and aft without moving laterally or rotating with respect to the seat bottom due to the coordinated movement of the outer table arm section 266 and the mid table arm section 260.

The display arm can include a lower display arm section 228 coupled to a display bracket 224 by an upper display arm section 236. The lower display arm section 228 can be coupled to the support plate 222 at the axis of rotation 248 by the proximal end 230 of the lower display arm section 228. A distal end 232 of the lower display arm section 228 can be rotationally coupled to the proximal end 238 of the upper display arm section 236 by a rotational joint 234. The rotational joint 234 can allow rotation of the upper display arm section 236 with respect to the lower display arm section 228 along an axis of rotation 278 that is perpendicular the axis of rotation 248. End stops can be used with the rotational joint 234 to limit rotation of the upper display arm section 236.

The upper display arm section 236 can include a distal end 240 that is coupled to the display bracket 224 at a pivot joint 244. The pivot joint 244 can allow the display bracket 224 to rotate about an axis of rotation 242 that is perpendicular axis of rotation 278. In some cases, the pivot joint 244 is rigidly coupled to the display bracket 224. In some cases, such as that depicted in FIG. 2, the pivot joint 244 can be rotationally coupled to the display bracket 224 by a tilt joint 246. The tilt joint 246 can allow rotation of the display bracket 224 with respect to the pivot joint 244 about an axis of rotation that is perpendicular to the axis of rotation 242.

The display bracket 224 can include mounting holes or hardware necessary to support a display, such as an in-flight entertainment display. Examples of suitable displays can include liquid crystal displays, light emitting diode displays, plasma displays, touch screen displays, or any other type of display. The display bracket 224 and other components of the display arm can include holes or hardware necessary to support or route any power or communication cables to the display. In some cases, the display can be have a diagonal screen size that is at least 8 inches, 9 inches, 10 inches, 11 inches, 12 inches, 13 inches, or 14 inches.

As depicted in FIG. 2, the stowable equipment apparatus 200 is positioned proximate a seat bottom 204. The stowable equipment apparatus 200 can be spaced apart from the seat bottom 204. The display arm can be positioned such that the display bracket 224 remains above the seat bottom 204 when in the stowed position. In some cases, the display arm can be positioned such that at least half of the display bracket 224 remains above the seat bottom 204 when in the stowed position. The pivot point (e.g., axis of rotation 248) can be positioned proximate the forward end of the support plate 222 and proximate the top of the support plate 222, thus being positioned proximate the forward end of the seat bottom 204 and spaced apart from a top surface of the seat bottom 204. This placement of the axis of rotation 248 of the display arm with respect to the support plate 222 can provide beneficial results in display arm functionality.

Not shown in FIG. 2 is a second support plate which can be located opposite support plate 222 to provide improved support to the coupling at the pivot point and to provide additional physical protection to the stowable equipment apparatus 200.

Figure 3:
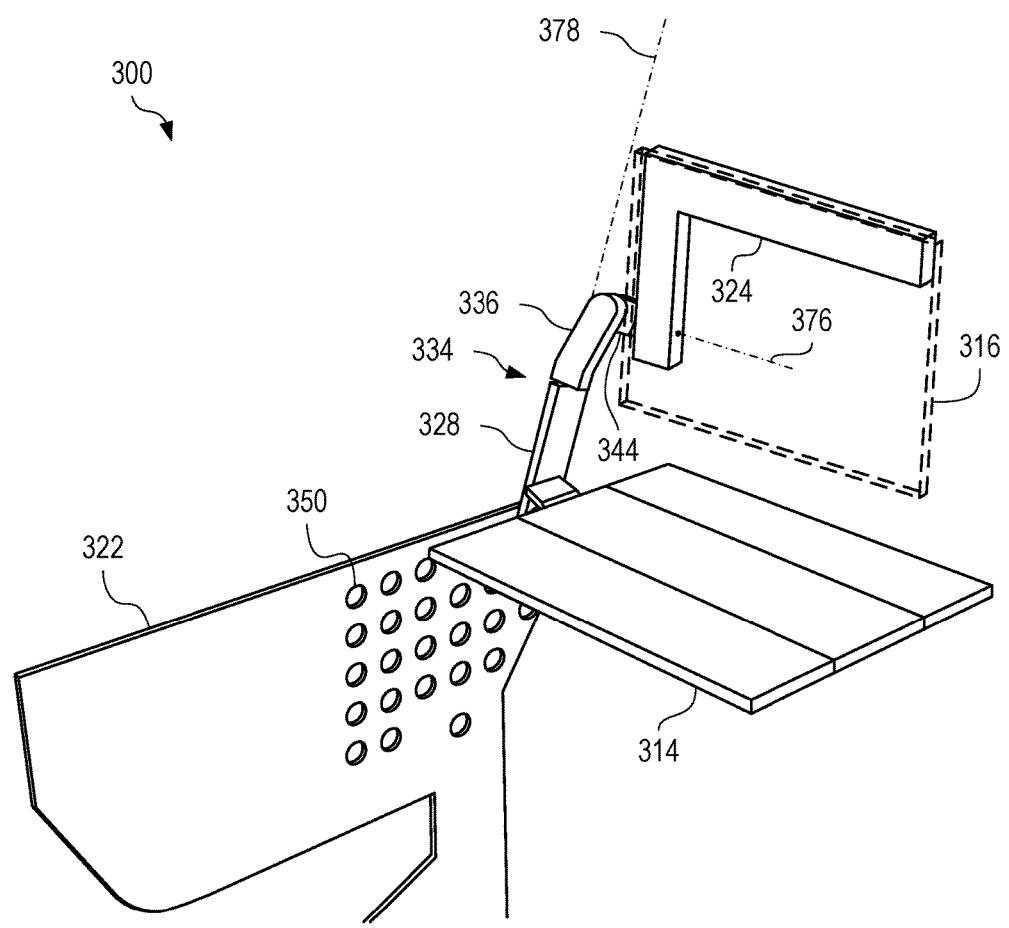
FIG. 3 is an axonometric view depicting a stowable equipment apparatus with a table surface and display bracket in respective deployed positions according to certain aspects of the present disclosure.

FIG. 3 is an axonometric view depicting a stowable equipment apparatus 300 with a table surface 314 and display bracket 324 in respective deployed positions according to certain aspects of the present disclosure. The stowable equipment apparatus 300 can be stowable equipment apparatus 200 of FIG. 2. The table surface 314 and display bracket 324 are supported by a table arm and display arm, respectively, from the support plate 322. The support plate 322 can have multiple mounting points 350. A display 316 is shown in dashed lines as being attached to the display bracket 324. Any suitable size display bracket 324 can be used. The size of display bracket 324 can be selected based on the size of the display 316 that is desired to be used.

The lower display arm section 328 can be rotated to extend out away from the support plate 322. The upper display arm section 336 can be rotated with respect to the lower display arm section 328 at rotational joint 334 along axis of rotation 378. Such rotation can position the display bracket 324 in front of a passenger sitting in a seat adjacent the support plate 322. The display bracket 324 can be further adjusted by rotating the display bracket 324 with respect to the bracket pivot joint 344 about axis of rotation 376. Rotation of the display bracket 324 about axis of rotation 376 can adjust the tilt of a display 316 mounted to the display bracket 324.

Figure 4:
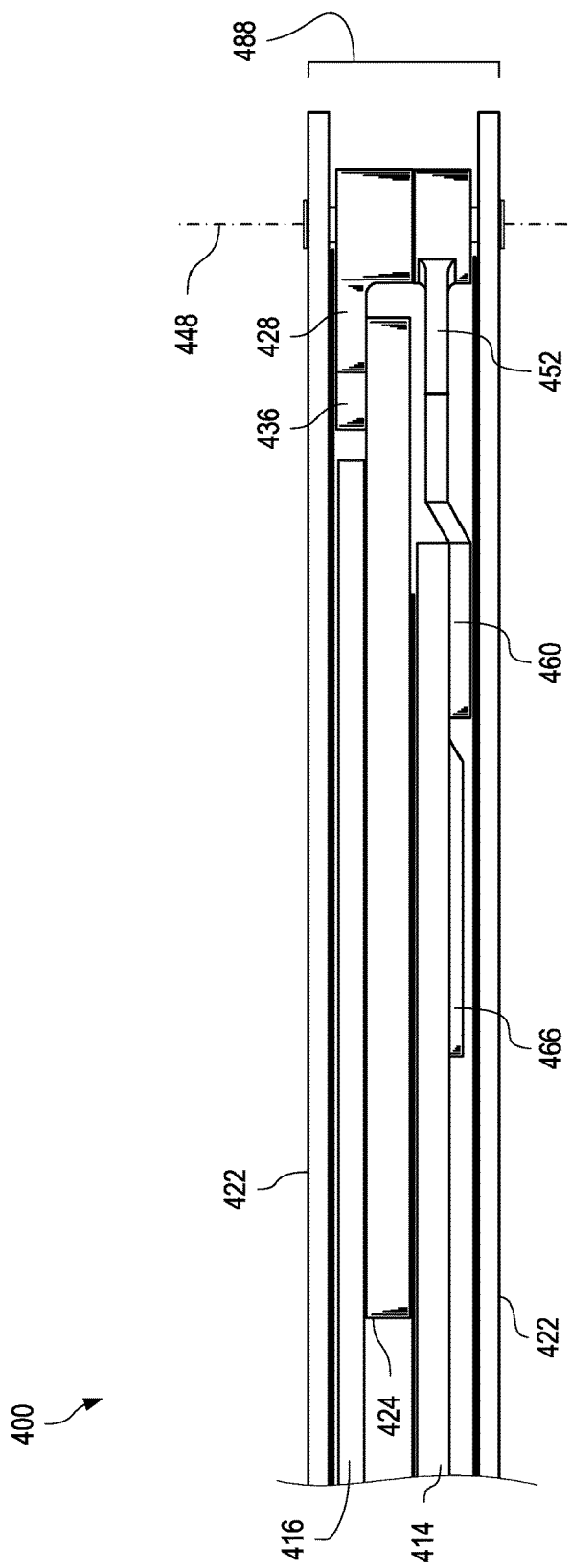
FIG. 4 is a partial top view of a stowable equipment apparatus 400 with a table surface and a display bracket in respective stowed positions according to certain aspects of the present disclosure.

FIG. 4 is a partial top view of a stowable equipment apparatus 400 with a table surface 414 and a display bracket 424 in respective stowed positions according to certain aspects of the present disclosure. The stowable equipment apparatus 400 can be stowable equipment apparatus 200 of FIG. 2. The lower display arm section can be pivotally coupled to the support plate 422 to rotate about the axis of rotation 448. The upper display arm 436 can couple the lower display arm 428 to the display bracket 424. A display 416 can be mounted on the display bracket 424 through any suitable mounting, such as screw, bolts, adhesives, or others. A table surface 414 can be coupled to an outer table arm section 466, which can be coupled to a mid table arm section 460, which can be coupled to an inner table arm section 452, which can be pivotally couplable to the support plate 422 to rotate about the axis of rotation 448.

In some cases, the width 488 of the stowable equipment apparatus 400 can be two inches or less. The space defined by the stowable equipment apparatus 400, specifically the space defined between the support plates 422, can be known as a storage module, within which the display bracket 424 and table surface 414 may be stored when in the stowed position. In some cases, support plates 422 may not extend the full length or height of the stowable equipment apparatus 400, with supplemental plates or dividers defining the full length or height of the stowable equipment apparatus 400, and thus the area known as the storage module may extend beyond the length or height of the support plates 422.

In some cases, the table arm and display arm can each be coupled between two support plates 422.

Generally, the stowable equipment apparatus 400 can be arranged such that the table surface 414 is closer to the seat of the passenger for whom the table surface 414 is intended to be used than the display bracket 424. While there may be enhanced maneuverability to such an arrangement, that need not be the case, and the table surface 414 can be positioned further from the seat of the passenger for whom the table surface 414 is intended to be used than the display bracket 424. As depicted in FIG. 4, the seat of the passenger for whom the table surface 414 or display 416 is intended to be used may be further down the page from the stowable equipment apparatus 400.

Figure 5:
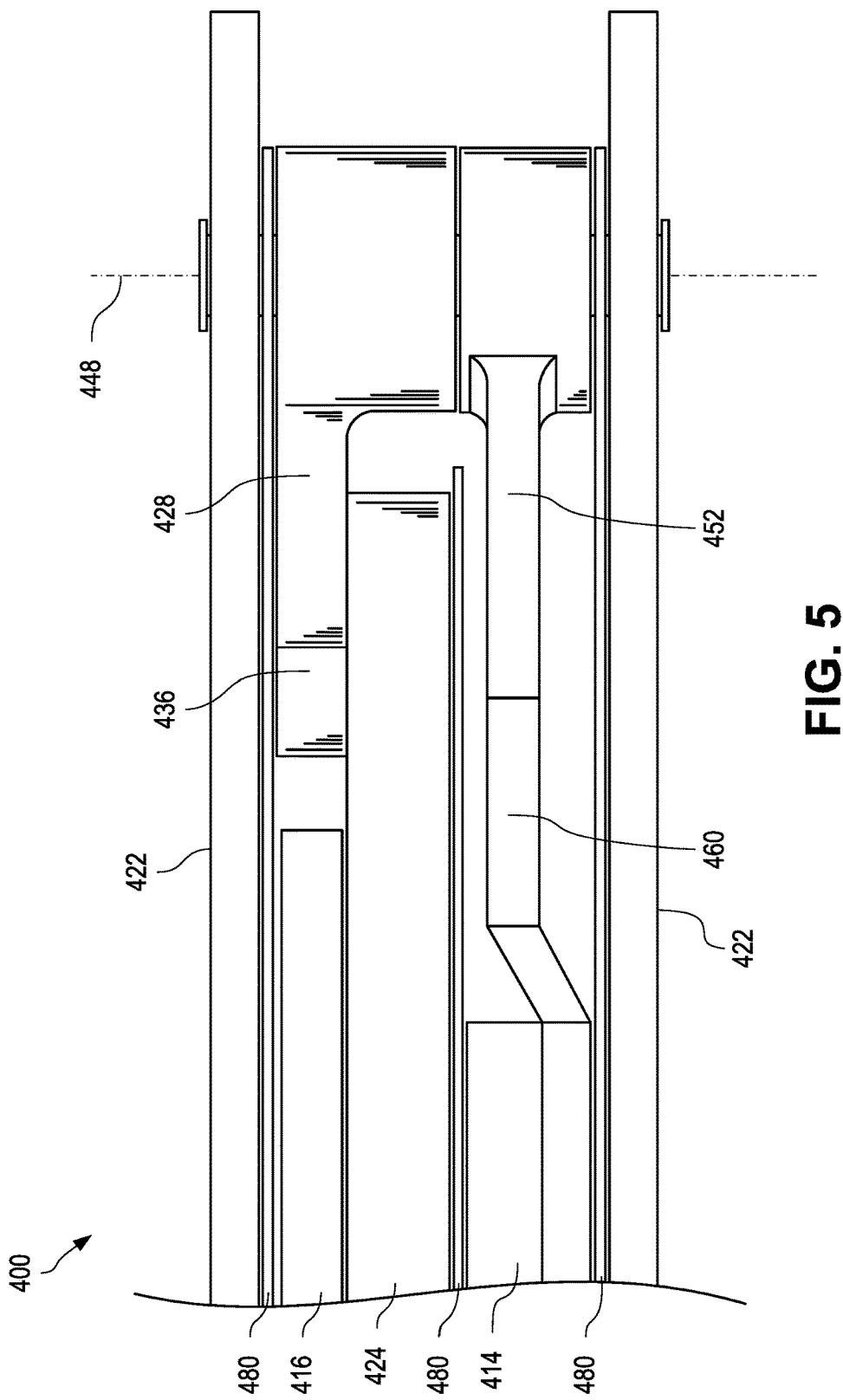
FIG. 5 is a close up top view of the stowable equipment apparatus of FIG. 4 according to certain aspects of the present disclosure.

FIG. 5 is a close up top view of the stowable equipment apparatus 400 of FIG. 4 according to certain aspects of the present disclosure. The lower display arm section can be pivotally coupled to the support plate 422 to rotate about the axis of rotation 448. The upper display arm 436 can couple the lower display arm 428 to the display bracket 424, which can support a display 416. A table surface 414 can be coupled to an outer table arm section 466, which can be coupled to a mid table arm section 460, which can be coupled to an inner table arm section 452, which can be pivotally couplable to the support plate 422 to rotate about the axis of rotation 448.

Dividers 480 can be positioned at various locations within the stowable equipment apparatus 400. Dividers 480 can provide enhanced protection to components of the stowable equipment apparatus 400. In some cases, a divider 480 can be positioned between the display 416 and the support plate 422. A divider 480 can be positioned between the display bracket 424 and the table surface 414. A divider 480 can be positioned between the outer table arm section 466 and the support plate 422. Dividers 480 can be supported by one or more support plates, by a spreader, or elsewhere.

Figure 6:
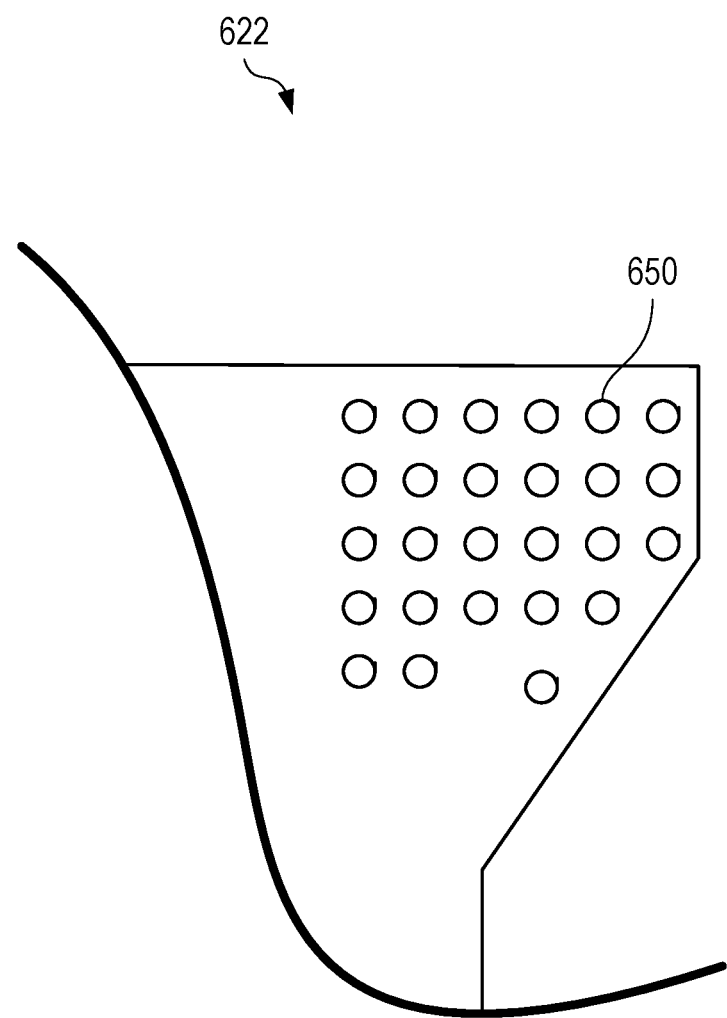
FIG. 6 is a partial side view of a support plate according to certain aspects of the present disclosure.

FIG. 6 is a partial side view of a support plate 622 according to certain aspects of the present disclosure. Support plate 622 Support plate 622 can include multiple mounting points 650. Each mounting point 650 can be a hole or aperture in the support plate 622. A support plate 622 can take any suitable shape or form that is able to provide a mounting point 650 to which a display arm can be coupled.

Figure 7:
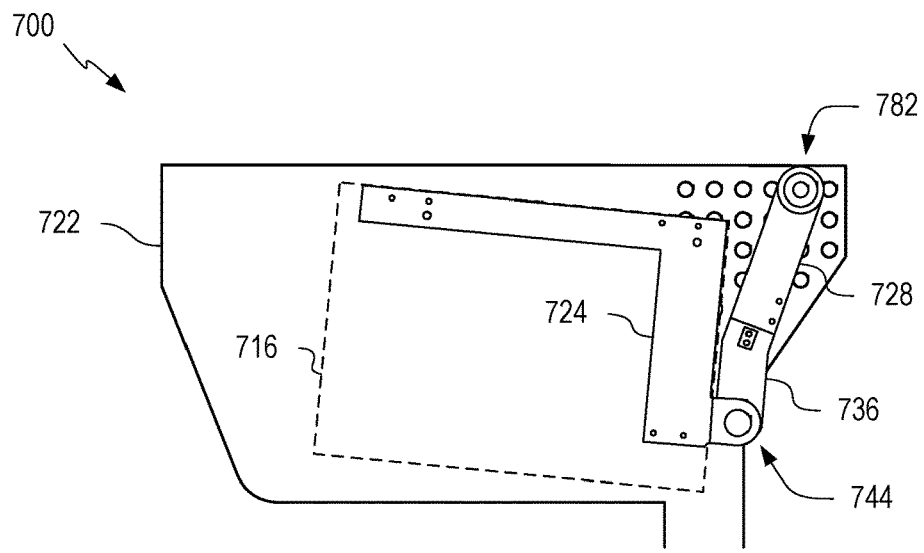
FIG. 7 is a side view of a stowable display apparatus in a stowed position according to certain aspects of the present disclosure.

FIG. 7 is a side view of a stowable display apparatus 700 in a stowed position according to certain aspects of the present disclosure. The lower display arm section 728 can be pivotally coupled to the support plate 722 at a pivot point 782. The upper display arm section 736 can be coupled to the lower display arm section 728. The display bracket 724, which can support a display 716, which is shown in dashed lines, can be coupled to a pivot joint 744. The pivot joint 744 can be pivotally coupled to the upper display arm section 736. The elements of the stowable display apparatus 700 can be the similar elements of stowable equipment apparatus 200 of FIG. 2 (e.g., the parts related to the deployment and stowing of display bracket 224).

When in the stowed position, the display bracket 724 can be contained within the storage module. When in the stowed position, the display bracket 724 or at least half of the display bracket 724 can be positioned below the pivot point 782. When in the stowed position, the display bracket 724 or at least half of the display bracket 724 can be positioned above a spreader or seat bottom. To manipulate the display bracket 724 into a deployed position, a passenger can simply grab a corner or portion of the display 716 or display bracket 724 (e.g., an ergonomic feature of the display bracket 724) and lift the display bracket 724 out of the storage module. As the display bracket 724 is lifted out of the storage module, the lower display arm section 728 will rotate about the pivot point 782 (e.g., in a clockwise direction as depicted in FIG. 7).

Figure 8:
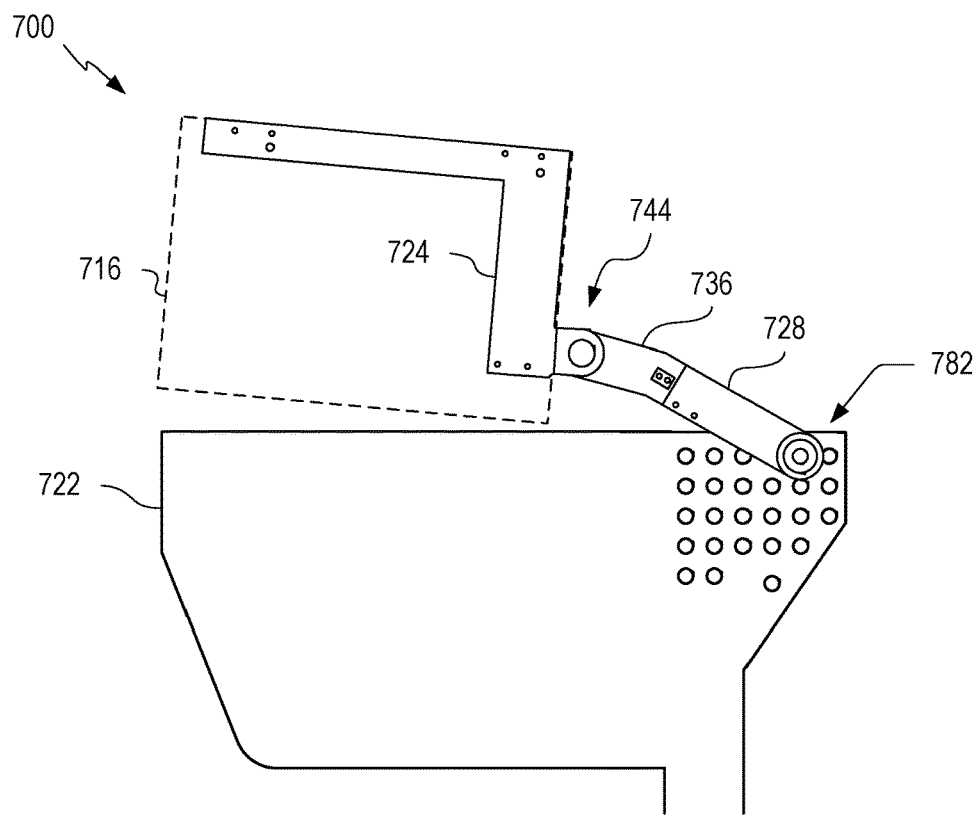
FIG. 8 is a side view of the stowable display apparatus of FIG. 7 in a first partially deployed position according to certain aspects of the present disclosure.

FIG. 8 is a side view of the stowable display apparatus 700 of FIG. 7 in a first partially deployed position according to certain aspects of the present disclosure. The lower display arm section 728 has rotated a portion of the way about the pivot point 782 as the display bracket 724, and thus the attached display 716, has been lifted out of the storage module (e.g., out and above the support plate 722.

In some cases, a mechanical linkage, such as a timing belt, rotationally couples the pivot point 782 and the pivot joint 744 such that rotation of the lower display arm section 728 about the pivot point 782 causes a coordinated rotation of the display bracket 724 with respect to the upper display arm section 736. This rotational coupling can maintain the display bracket 724, and thus the attached display 716, in a consistent orientation (e.g., with respect to the passenger seat).

Figure 9:
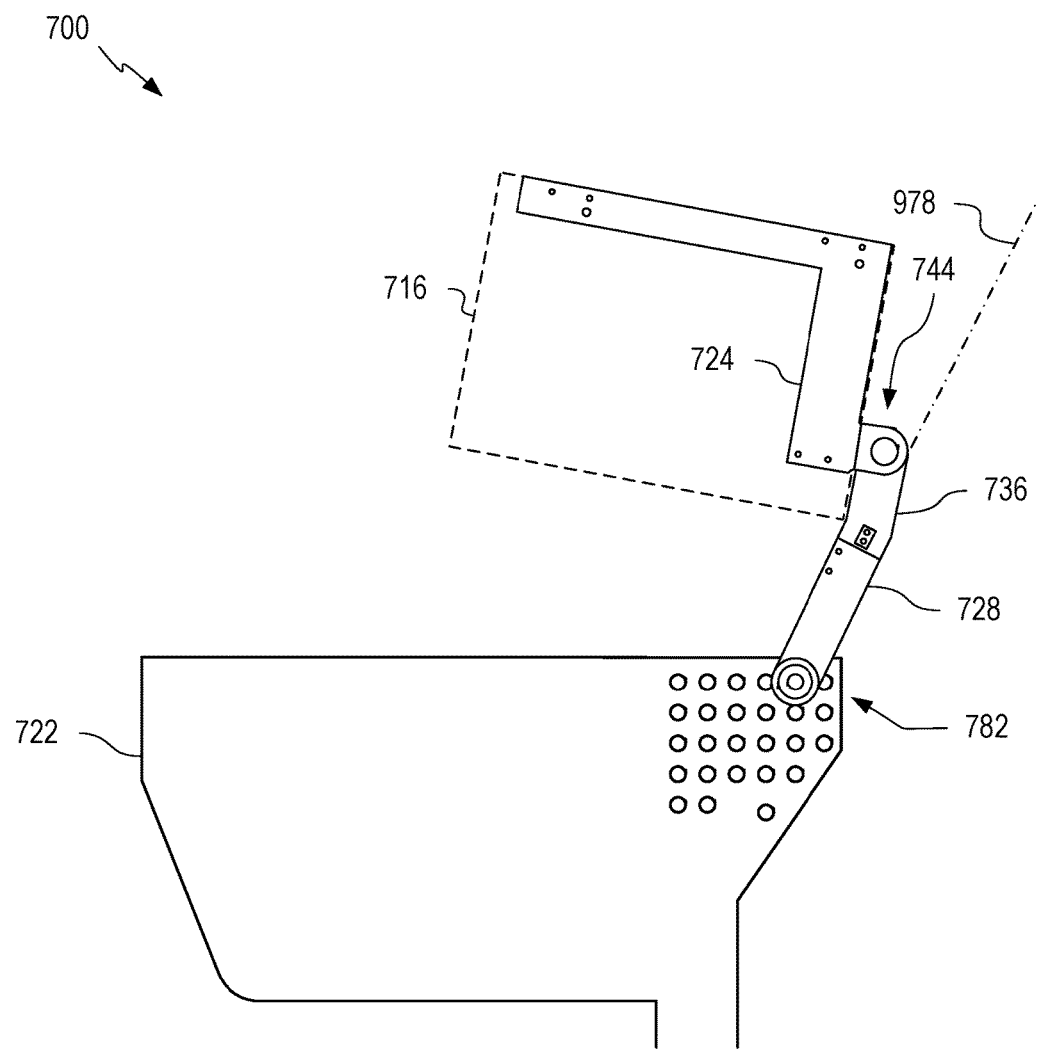
FIG. 9 is a side view of the stowable display apparatus of FIG. 7 in a second partially deployed position according to certain aspects of the present disclosure.

FIG. 9 is a side view of the stowable display apparatus 700 of FIG. 7 in a second partially deployed position according to certain aspects of the present disclosure. In the second partially deployed position, the lower display arm section 728 has rotated about the pivot point 782 of the support plate 722 to its stopping point. An end stop can be used to set this stopping point. The lower display arm section 728, upper display arm section 738, pivot joint 744, display bracket 724, and display 716 may all still lie within the same set of planes that are all perpendicular to the axis of rotation of the pivot joint 744.

In order to move the display bracket 724, and thus its attached display 716, out of a plane that is perpendicular to the axis of rotation of the pivot joint 744, the upper display arm section 736 can rotate with respect to the lower display arm section 728 about axis of rotation 978.

In the second partially deployed position, at least a portion of the display bracket 724 has passed over the pivot point 782.

Figure 10:
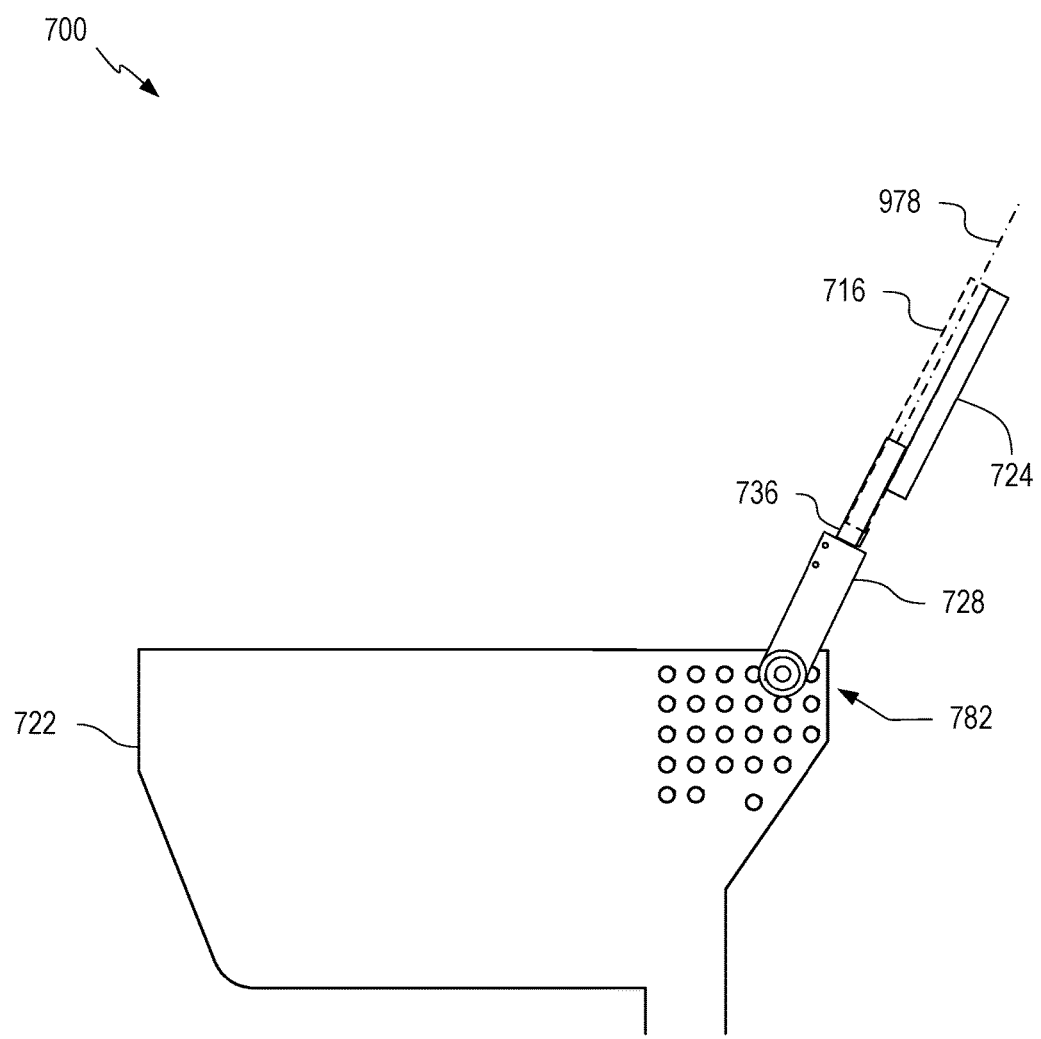
FIG. 10 is a side view of the stowable display apparatus of FIG. 7 in a deployed position according to certain aspects of the present disclosure.

FIG. 10 is a side view of the stowable display apparatus 700 of FIG. 7 in a deployed position according to certain aspects of the present disclosure. In the deployed position, the lower display arm section 728 has rotated about the pivot point 782 of the support plate 722 to its stopping point and the upper display arm section 736 has rotated with respect to the lower display arm section 728 about axis of rotation 978. One or more end stops can be used to stop the upper display arm section 736 from rotating more than 90°, 100°, 110°, 120°, or 130°.

Figure 11:
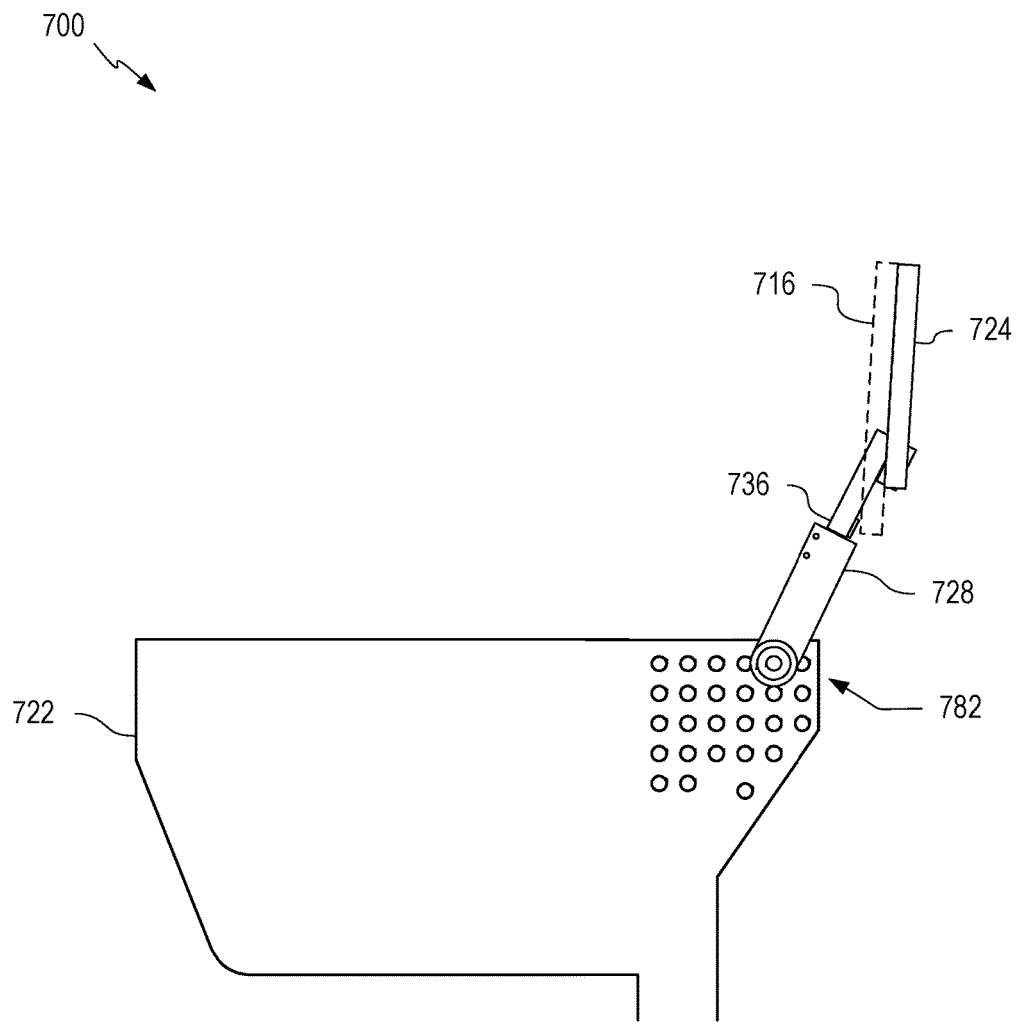
FIG. 11 is a side view of the stowable display apparatus of FIG. 7 in a deployed position with a tilted display bracket according to certain aspects of the present disclosure.

FIG. 11 is a side view of the stowable display apparatus 700 of FIG. 7 in a deployed position with a tilted display bracket 724 according to certain aspects of the present disclosure. In the deployed position, the lower display arm section 728 has rotated about the pivot point 782 of the support plate 722 to its stopping point and the upper display arm section 736 has rotated with respect to the lower display arm section 728 about axis of rotation 978. The display bracket 724 has been rotated with respect to the pivot joint 744 to adjust the tilt of the display 716 with respect to the passenger seat.

Figure 12:
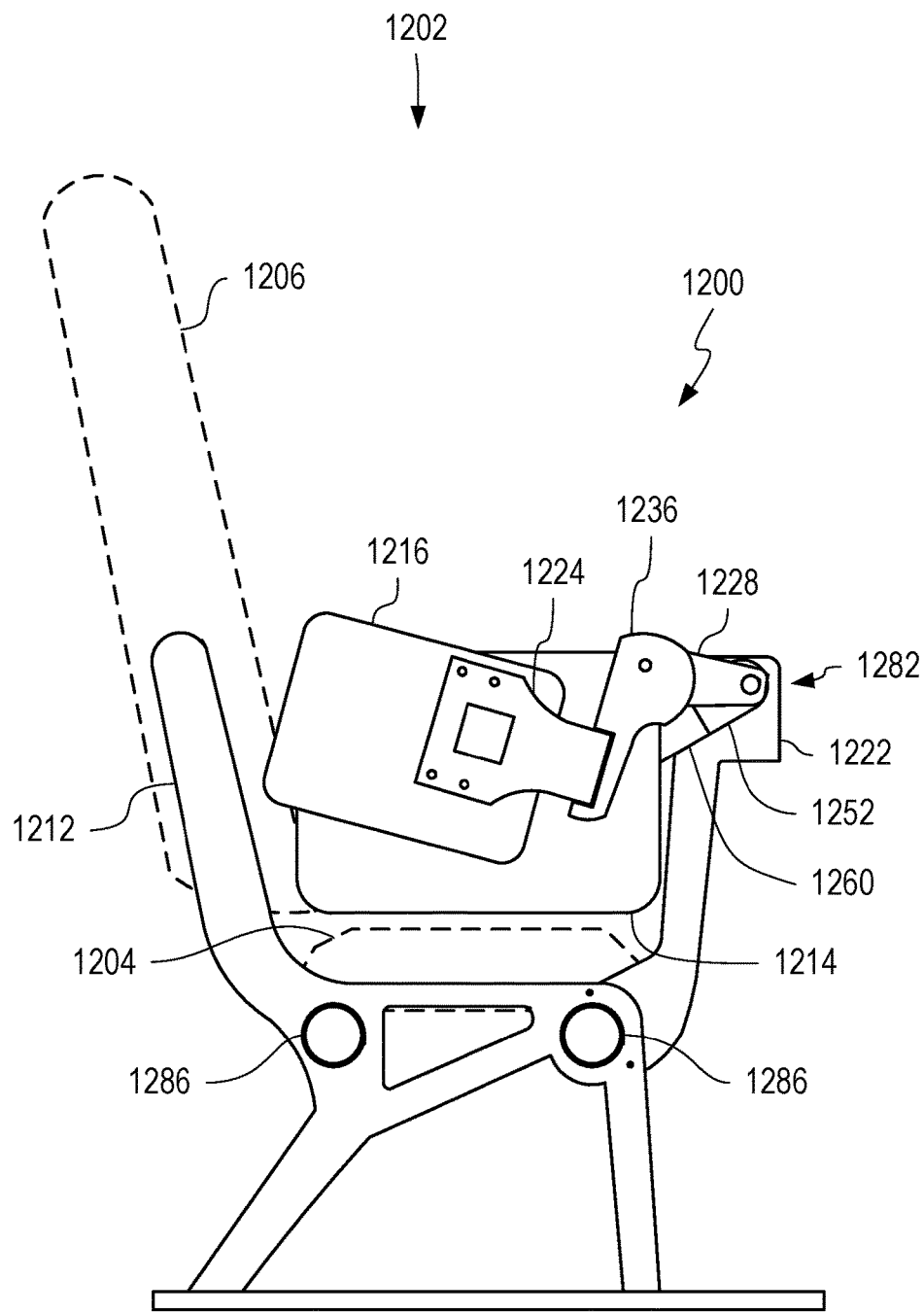
FIG. 12 is a side view depicting an alternate embodiment of a stowable display apparatus in a stowed position as used on a passenger seat according to certain aspects of the present disclosure.

FIG. 12 is a side view depicting an alternate embodiment of a stowable display apparatus 1200 in a stowed position as used on a passenger seat 1202 according to certain aspects of the present disclosure. The passenger seat 1202 can include a spreader 1212 supporting a pair of stretcher tubes 1286. A seat bottom 1204 can be supported by the spreader 1212 via the stretcher tubes 1286. The seatback 1206 can be supported by the spreader 1212 (e.g., via the stretcher tubes 1286). When sitting in passenger seat 1202, a passenger would access the stowable display apparatus 1200 to the passenger's right (e.g., towards the foreground of FIG. 12).

A support plate 1222 can be secured to the spreader 1212, such as by screws, bolts, adhesives, or other fasteners or fastening mechanisms. A table surface 1214 can be pivotally coupled to the support plate 1222 by an inner table arm section 1252, a mid table arm section 1260, and an outer table arm section.

Figure 13:
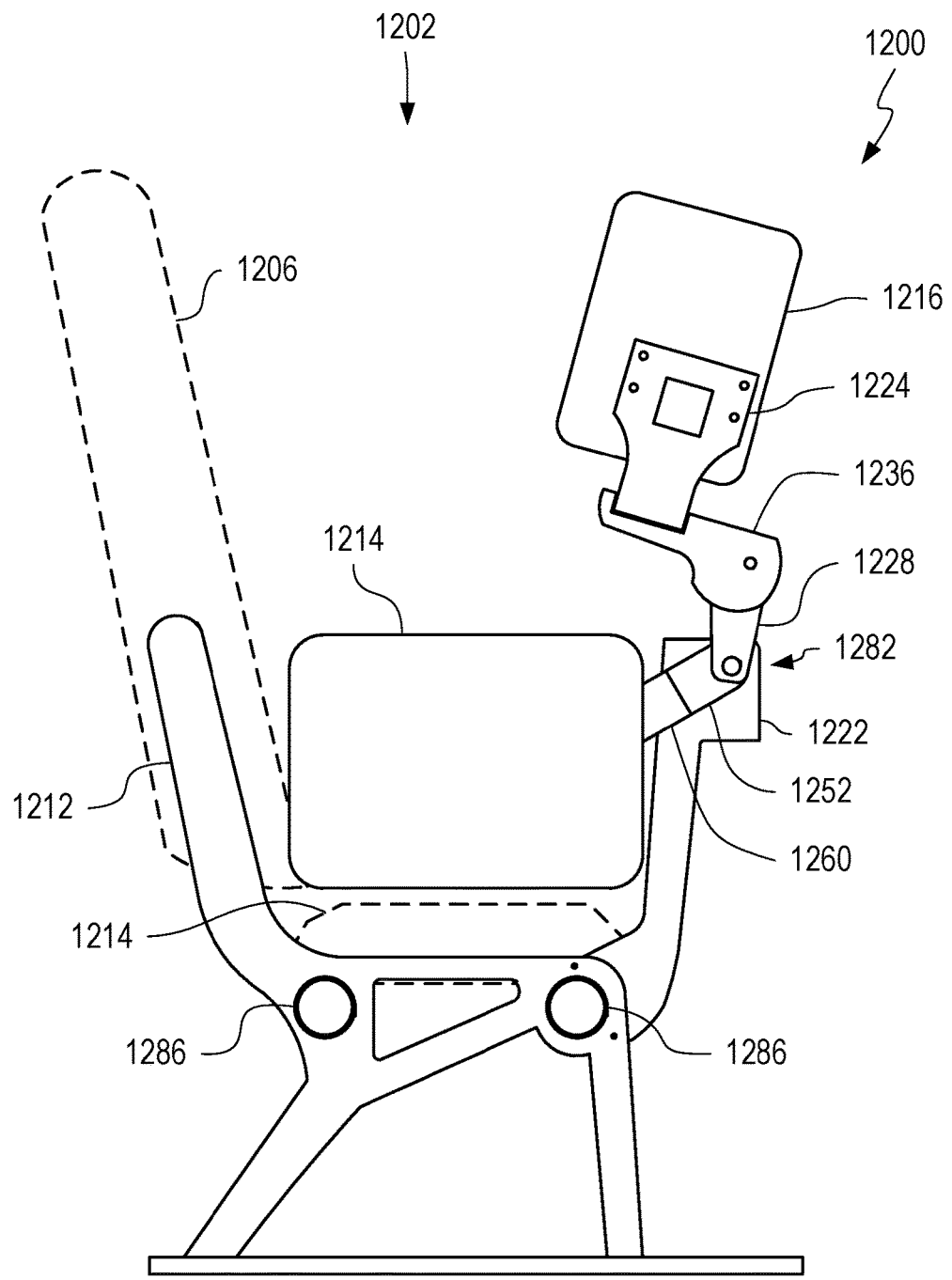
FIG. 13 is a side view of the stowable display apparatus of FIG. 12 in a first partially deployed position according to certain aspects of the present disclosure.

A display 1216 can be coupled to a display bracket 1224 that is coupled to an upper display arm section 1236 and a lower display arm section 1228. The lower display arm section 1228 can be pivotally coupled to the support plate 1222 at the pivot point 1282. As depicted in FIG. 13, the upper display arm section 1236 is pivotally coupled to the lower display arm section 1228 to rotate about an axis that is parallel the axis of rotation of the pivot point 1282. The display bracket is pivotally coupled to the upper display arm section 1236 to rotate outside of a plane perpendicular to the axis of rotation of the pivot point 782

FIG. 13 is a side view of the stowable display apparatus 1200 of FIG. 12 in a first partially deployed position according to certain aspects of the present disclosure. The lower display arm section 1228 has been rotated about pivot point 1282 to its stopping point. End stops can be used to set the stopping point. As the lower display arm section 1228 rotates to its stopping point, the display 1216 travels in an arc about the pivot point 1282.

Figure 14:
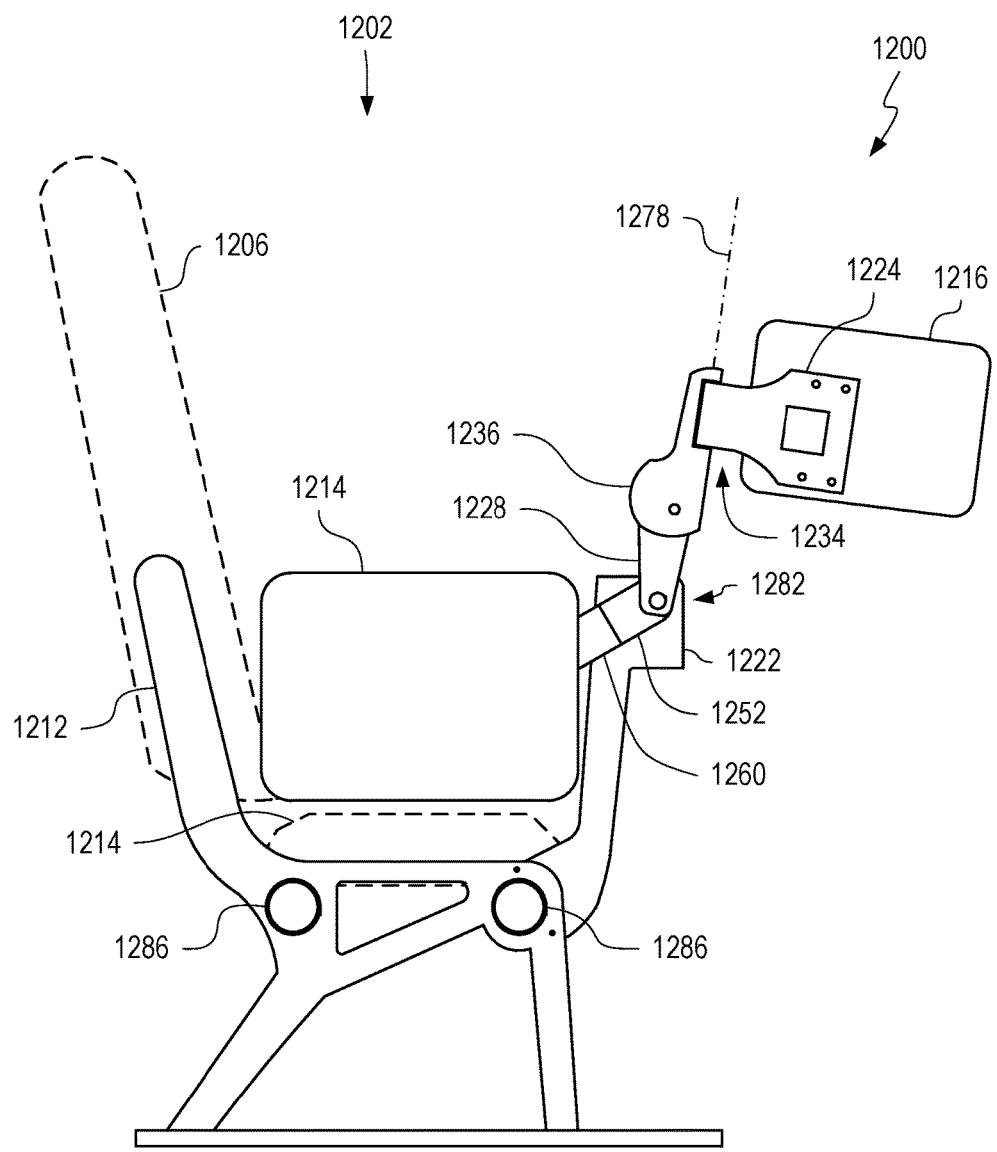
FIG. 14 is a side view of the stowable display apparatus of FIG. 12 in a second partially deployed position according to certain aspects of the present disclosure.

FIG. 14 is a side view of the stowable display apparatus 1200 of FIG. 12 in a second partially deployed position according to certain aspects of the present disclosure. The lower display arm section 1228 had been rotated about pivot point 1282 to its stopping point and the upper display arm section 1236 has rotated with respect to the lower display arm section 1228 to a stopping point. In order to rotate the display bracket 1224, and thus the attached display 1216, outside of a plane perpendicular to the axis of rotation of the pivot point 1282, the display bracket 1224 can rotate, with respect to the upper display arm section 1236, about axis 1278.

Figure 15:
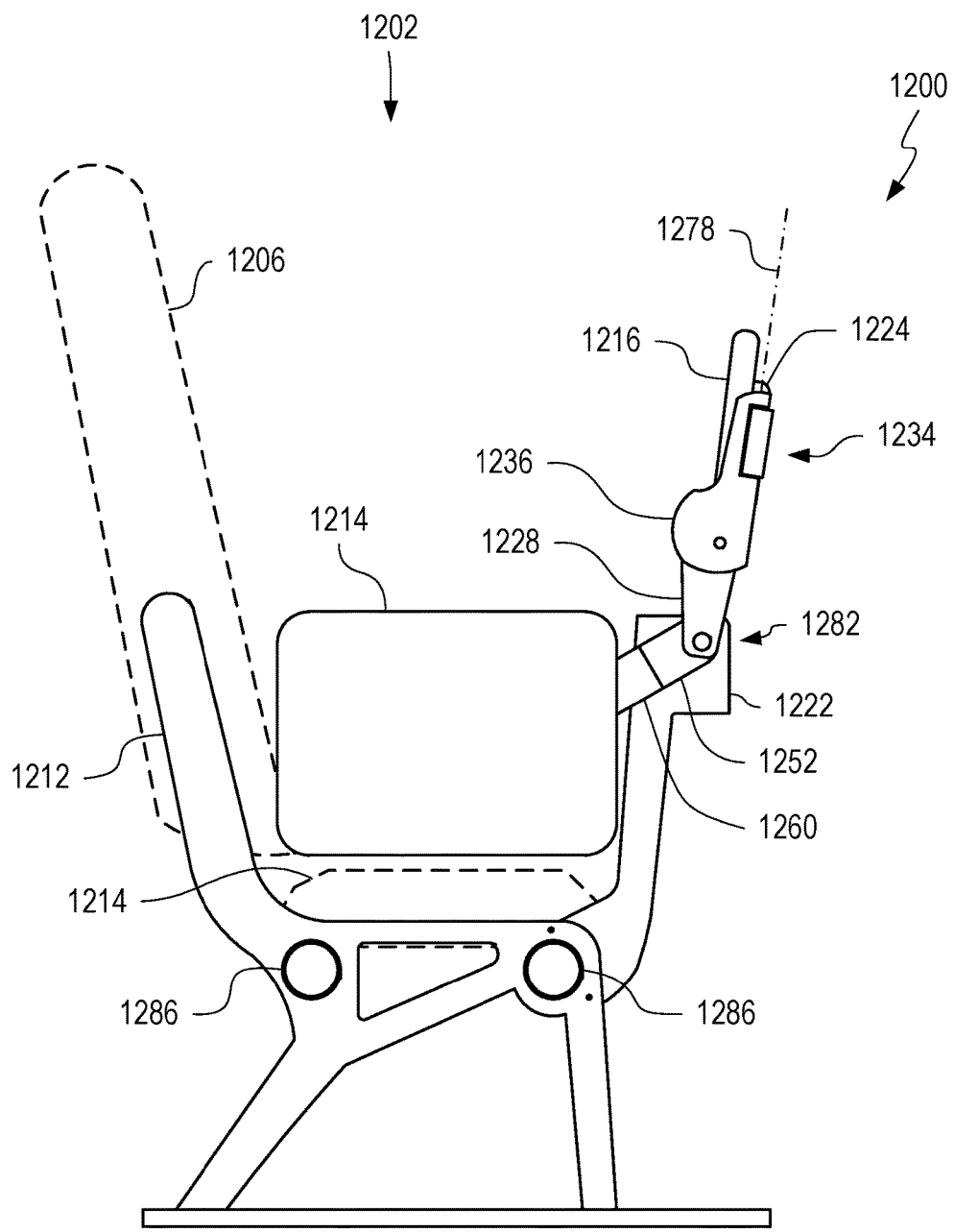
FIG. 15 is a side view of the stowable display apparatus of FIG. 12 in a deployed position according to certain aspects of the present disclosure.

FIG. 15 is a side view of the stowable display apparatus 1200 of FIG. 12 in a deployed position according to certain aspects of the present disclosure. The lower display arm section 1228 had been rotated about pivot point 1282 to its stopping point, the upper display arm section 1236 has rotated with respect to the lower display arm section 1228 to a stopping point, and the display bracket 1224 has rotated, with respect to the upper display arm section 1236, about axis 1278 and thus outside of a plane perpendicular to the axis of rotation of the pivot point 1282. Therefore, the display 1216 is now in a deployed position suitable for a passenger in passenger seat 1202 to view or operate the display 1216.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

As used below, any reference to a series of examples is to be understood as a reference to each of those examples disjunctively (e.g., "Examples 1-4" is to be understood as "Examples 1, 2, 3, or 4").

Example 1 is a stowable equipment apparatus for use with passenger seats, the apparatus comprising: a storage module couplable to a seat structure having a seat bottom, the storage module including a mounting plate; a table arm pivotally coupled to the mounting plate and movable between a table stowed position and a table deployed position, the table arm supporting a table surface, wherein the table surface is located within the storage module when the table arm is in the table stowed position, and wherein the table surface is located outside of the storage module when the table arm is in the table deployed position; and a display arm pivotally coupled to the mounting plate at a pivot point and movable between a display stowed position and a display deployed position, the display arm comprising a display bracket couplable to a display, wherein the display bracket is located within the storage module when the display arm is in the display stowed position, wherein the display bracket is located outside of the storage module when the display arm is in the display deployed position, wherein the pivot point is located above the seat bottom, wherein at least half of the display bracket is located above the seat bottom when the display arm is in the display stowed position, and wherein at least a portion of the display bracket passes above the pivot point when moving between the display stowed position and the display deployed position.

Example 2 is the apparatus of example 1, wherein the table arm is pivotally coupled to the mounting plate at the pivot point.

Example 3 is the apparatus of examples 1 or 2, wherein the table arm is movable between the table stowed position and the table deployed position when the display arm is in the display stowed position and when the display arm is in the display deployed position.

Example 4 is the apparatus of examples 1-3, wherein the display arm further comprises a lower display arm section having a proximal end coupled to the mounting plate at the pivot point, wherein the display bracket is pivotally coupled to the lower display arm to rotate the display bracket outside of a plane perpendicular to an axis of rotation of the pivot point.

Example 5 is the apparatus of example 4, wherein the display arm further comprises an upper display arm section coupled between the lower display arm section and the display bracket, wherein upper display arm section is rotatable with respect to the lower display arm section to permit pivoting of the display bracket outside of the plane perpendicular to the axis of rotation of the pivot point.

Example 6 is the apparatus of examples 4 or 5, wherein the display arm further comprises an upper display arm section coupled between the lower display arm section and the display bracket, wherein display bracket is pivotally coupled to the upper display arm section to permit pivoting of the display bracket outside of the plane perpendicular to the axis of rotation of the pivot point.

Example 7 is the apparatus of examples 1-6, wherein the display bracket is further pivotally coupled with respect to the lower display arm section to rotate within the plane perpendicular to the axis of rotation of the pivot point, wherein the display arm further comprises a mechanical linkage coupled to the display bracket to rotate the display bracket within the plane perpendicular to the axis of rotation of the pivot point while the display arm is moving between the display stowed position and the display deployed position such that the display bracket maintains an upright orientation despite rotation of the display arm about the pivot point.

Example 8 is the apparatus of examples 1-7, wherein the storage module has a width equal to or less than two inches.

Example 9 is a passenger seat, comprising: a spreader supporting horizontal stretcher tubes; a seat bottom supported by the horizontal stretcher tubes and positioned proximate the spreader; an armrest assembly coupled to the spreader, wherein the armrest assembly includes a storage module having a mounting plate; a table arm pivotally coupled to the mounting plate and movable between a table stowed position and a table deployed position, the table arm supporting a table surface, wherein the table surface is located within the storage module when the table arm is in the table stowed position, and wherein the table surface is located outside of the storage module when the table arm is in the table deployed position; and a display arm pivotally coupled to the mounting plate at a pivot point and movable between a display stowed position and a display deployed position, the display arm comprising a display bracket couplable to a display, wherein the display bracket is located within the storage module when the display arm is in the display stowed position, wherein the display bracket is located outside of the storage module when the display arm is in the display deployed position, wherein the pivot point is located above the seat bottom, wherein at least half of the display bracket is located above the seat bottom when the display arm is in the display stowed position, and wherein at least a portion of the display bracket passes above the pivot point when moving between the display stowed position and the display deployed position.

Example 10 is the passenger seat of example 9, wherein the table arm is pivotally coupled to the mounting plate at the pivot point.

Example 11 is the passenger seat of examples 9 or 10, wherein the table arm is movable between the table stowed position and the table deployed position when the display arm is in the display stowed position and when the display arm is in the display deployed position.

Example 12 is the passenger seat of examples 9-11, wherein the display arm further comprises a lower display arm section having a proximal end coupled to the mounting plate at the pivot point, wherein the display bracket is pivotally coupled to the lower display arm to rotate the display bracket outside of a plane perpendicular to an axis of rotation of the pivot point.

Example 13 is the passenger seat of example 12, wherein the display arm further comprises an upper display arm section coupled between the lower display arm section and the display bracket, wherein upper display arm section is rotatable with respect to the lower display arm section to permit pivoting of the display bracket outside of the plane perpendicular to the axis of rotation of the pivot point.

Example 14 is the passenger seat of examples 12 or 13, wherein the display arm further comprises an upper display arm section coupled between the lower display arm section and the display bracket, wherein display bracket is pivotally coupled to the upper display arm section to permit pivoting of the display bracket outside of the plane perpendicular to the axis of rotation of the pivot point.

Example 15 is the passenger seat of examples 9-14, wherein the display bracket is further pivotally coupled with respect to the lower display arm section to rotate within the plane perpendicular to the axis of rotation of the pivot point, wherein the display arm further comprises a mechanical linkage coupled to the display bracket to rotate the display bracket within the plane perpendicular to the axis of rotation of the pivot point while the display arm is moving between the display stowed position and the display deployed position such that the display bracket maintains an upright orientation despite rotation of the display arm about the pivot point.

Example 16 is the passenger seat of examples 9-15, wherein the storage module has a width equal to or less than two inches.

Example 17 is a stowable equipment arm assembly comprising: a display arm pivotally couplable to a mounting plate of a storage module at a pivot point and movable between a display stowed position and a display deployed position, the display arm comprising: a display bracket couplable to a display, wherein the display bracket is located within the storage module when the display arm is in the display stowed position, wherein the display bracket is located outside of the storage module when the display arm is in the display deployed position, and wherein at least a portion of the display bracket passes above the pivot point when moving between the display stowed position and the display deployed position; and a lower display arm section having a proximal end coupled to the mounting plate at the pivot point, wherein the display bracket is pivotally coupled to the lower display arm to rotate the display bracket outside of a plane perpendicular to an axis of rotation of the pivot point.

Example 18 is the assembly of example 17, wherein the display arm further comprises an upper display arm section coupled between the lower display arm section and the display bracket, wherein upper display arm section is rotatable with respect to the lower display arm section to permit pivoting of the display bracket outside of the plane perpendicular to the axis of rotation of the pivot point.

Example 19 is the passenger seat of examples 17 or 18, wherein the display arm further comprises an upper display arm section coupled between the lower display arm section and the display bracket, wherein display bracket is pivotally coupled to the upper display arm section to permit pivoting of the display bracket outside of the plane perpendicular to the axis of rotation of the pivot point.

Example 20 is the passenger seat of examples 17-19, wherein the display bracket is further pivotally coupled with respect to the lower display arm section to rotate within the plane perpendicular to the axis of rotation of the pivot point, wherein the display arm further comprises a mechanical linkage coupled to the display bracket to rotate the display bracket within the plane perpendicular to the axis of rotation of the pivot point while the display arm is moving between the display stowed position and the display deployed position such that the display bracket maintains an upright orientation despite rotation of the display arm about the pivot point.

That which is claimed is:

1. A stowable equipment apparatus for use with passenger seats, the apparatus comprising:
   a storage module couplable to a seat structure having a seat bottom, the storage module including a mounting plate;
   a table arm pivotally coupled to the mounting plate and movable between a table stowed position and a table deployed position, the table arm supporting a table surface, wherein the table surface is located within the storage module when the table arm is in the table stowed position, and wherein the table surface is located outside of the storage module when the table arm is in the table deployed position; and
   a display arm pivotally coupled to the mounting plate at a pivot point and movable between a display stowed position and a display deployed position, the display arm comprising a display bracket couplable to a display, wherein the display bracket is located within the storage module when the display arm is in the display stowed position, wherein the display bracket is located outside of the storage module when the display arm is in the display deployed position, wherein the pivot point is located above the seat bottom, wherein at least half of the display bracket is located above the seat bottom when the display arm is in the display stowed position, and wherein at least a portion of the display bracket passes above the pivot point when moving between the display stowed position and the display deployed position.

2. The apparatus of claim 1, wherein the table arm is pivotally coupled to the mounting plate at the pivot point.

3. The apparatus of claim 1, wherein the table arm is movable between the table stowed position and the table deployed position when the display arm is in the display stowed position and when the display arm is in the display deployed position.

4. The apparatus of claim 1, wherein the display arm further comprises a lower display arm section having a proximal end coupled to the mounting plate at the pivot point, wherein the display bracket is pivotally coupled to the lower display arm to rotate the display bracket outside of a plane perpendicular to an axis of rotation of the pivot point.

5. The apparatus of claim 4, wherein the display arm further comprises an upper display arm section coupled between the lower display arm section and the display bracket, wherein upper display arm section is rotatable with respect to the lower display arm section to permit pivoting of the display bracket outside of the plane perpendicular to the axis of rotation of the pivot point.

6. The apparatus of claim 4, wherein the display arm further comprises an upper display arm section coupled between the lower display arm section and the display bracket, wherein display bracket is pivotally coupled to the upper display arm section to permit pivoting of the display bracket outside of the plane perpendicular to the axis of rotation of the pivot point.

7. The apparatus of claim 1, wherein the display bracket is further pivotally coupled with respect to the lower display arm section to rotate within the plane perpendicular to the axis of rotation of the pivot point, wherein the display arm further comprises a mechanical linkage coupled to the display bracket to rotate the display bracket within the plane perpendicular to the axis of rotation of the pivot point while the display arm is moving between the display stowed position and the display deployed position such that the display bracket maintains an upright orientation despite rotation of the display arm about the pivot point.

8. The apparatus of claim 1, wherein the storage module has a width equal to or less than two inches.

9. A passenger seat, comprising:
   a spreader supporting horizontal stretcher tubes;
   a seat bottom supported by the horizontal stretcher tubes and positioned proximate the spreader;
   an armrest assembly coupled to the spreader, wherein the armrest assembly includes a storage module having a mounting plate;
   a table arm pivotally coupled to the mounting plate and movable between a table stowed position and a table deployed position, the table arm supporting a table surface, wherein the table surface is located within the storage module when the table arm is in the table stowed position, and wherein the table surface is located outside of the storage module when the table arm is in the table deployed position; and
   a display arm pivotally coupled to the mounting plate at a pivot point and movable between a display stowed position and a display deployed position, the display arm comprising a display bracket couplable to a display, wherein the display bracket is located within the storage module when the display arm is in the display stowed position, wherein the display bracket is located outside of the storage module when the display arm is in the display deployed position, wherein the pivot point is located above the seat bottom, wherein at least half of the display bracket is located above the seat bottom when the display arm is in the display stowed position, and wherein at least a portion of the display bracket passes above the pivot point when moving between the display stowed position and the display deployed position.

10. The passenger seat of claim 9, wherein the table arm is pivotally coupled to the mounting plate at the pivot point.

11. The passenger seat of claim 9, wherein the table arm is movable between the table stowed position and the table deployed position when the display arm is in the display stowed position and when the display arm is in the display deployed position.

12. The passenger seat of claim 9, wherein the display arm further comprises a lower display arm section having a proximal end coupled to the mounting plate at the pivot point, wherein the display bracket is pivotally coupled to the lower display arm to rotate the display bracket outside of a plane perpendicular to an axis of rotation of the pivot point.

13. The passenger seat of claim 12, wherein the display arm further comprises an upper display arm section coupled between the lower display arm section and the display bracket, wherein upper display arm section is rotatable with respect to the lower display arm section to permit pivoting of the display bracket outside of the plane perpendicular to the axis of rotation of the pivot point.

14. The passenger seat of claim 12, wherein the display arm further comprises an upper display arm section coupled between the lower display arm section and the display bracket, wherein display bracket is pivotally coupled to the upper display arm section to permit pivoting of the display bracket outside of the plane perpendicular to the axis of rotation of the pivot point.

15. The passenger seat of claim 9, wherein the display bracket is further pivotally coupled with respect to the lower display arm section to rotate within the plane perpendicular to the axis of rotation of the pivot point, wherein the display arm further comprises a mechanical linkage coupled to the display bracket to rotate the display bracket within the plane perpendicular to the axis of rotation of the pivot point while the display arm is moving between the display stowed position and the display deployed position such that the display bracket maintains an upright orientation despite rotation of the display arm about the pivot point.

16. The passenger seat of claim 9, wherein the storage module has a width equal to or less than two inches.

* * * * *